May 5, 1953 F. W. STEERE 2,637,121
PROCESS FOR TREATING FOLIAGE CROPS AND THE LIKE
Filed Nov. 4, 1947 3 Sheets-Sheet 1
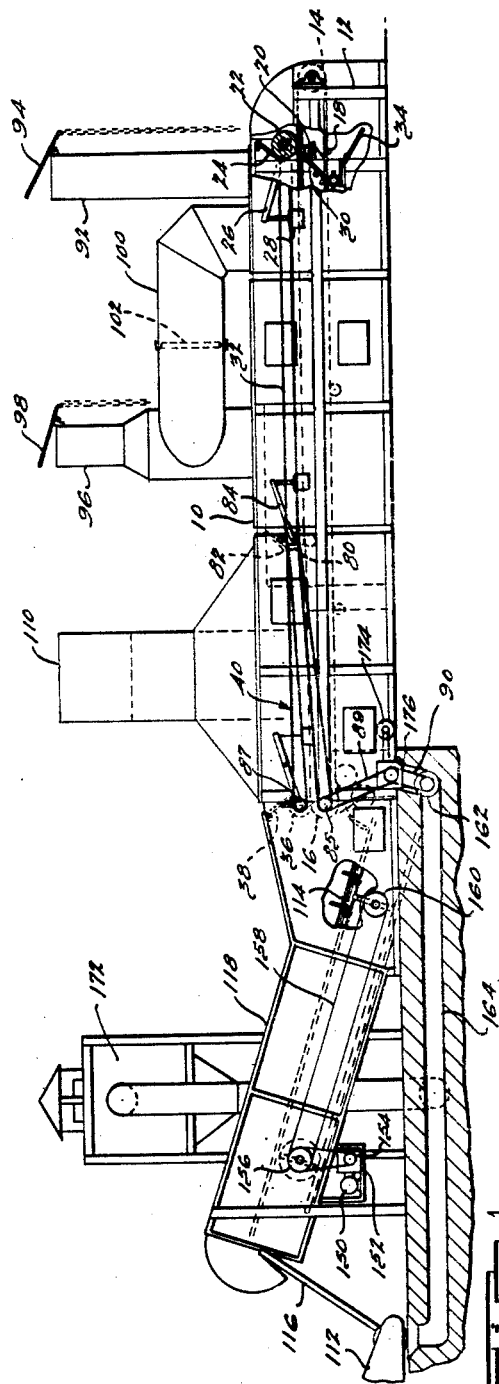
INVENTOR.
Frank W. Steere.
BY
Harness, Dickey & Pierce
ATTORNEYS.

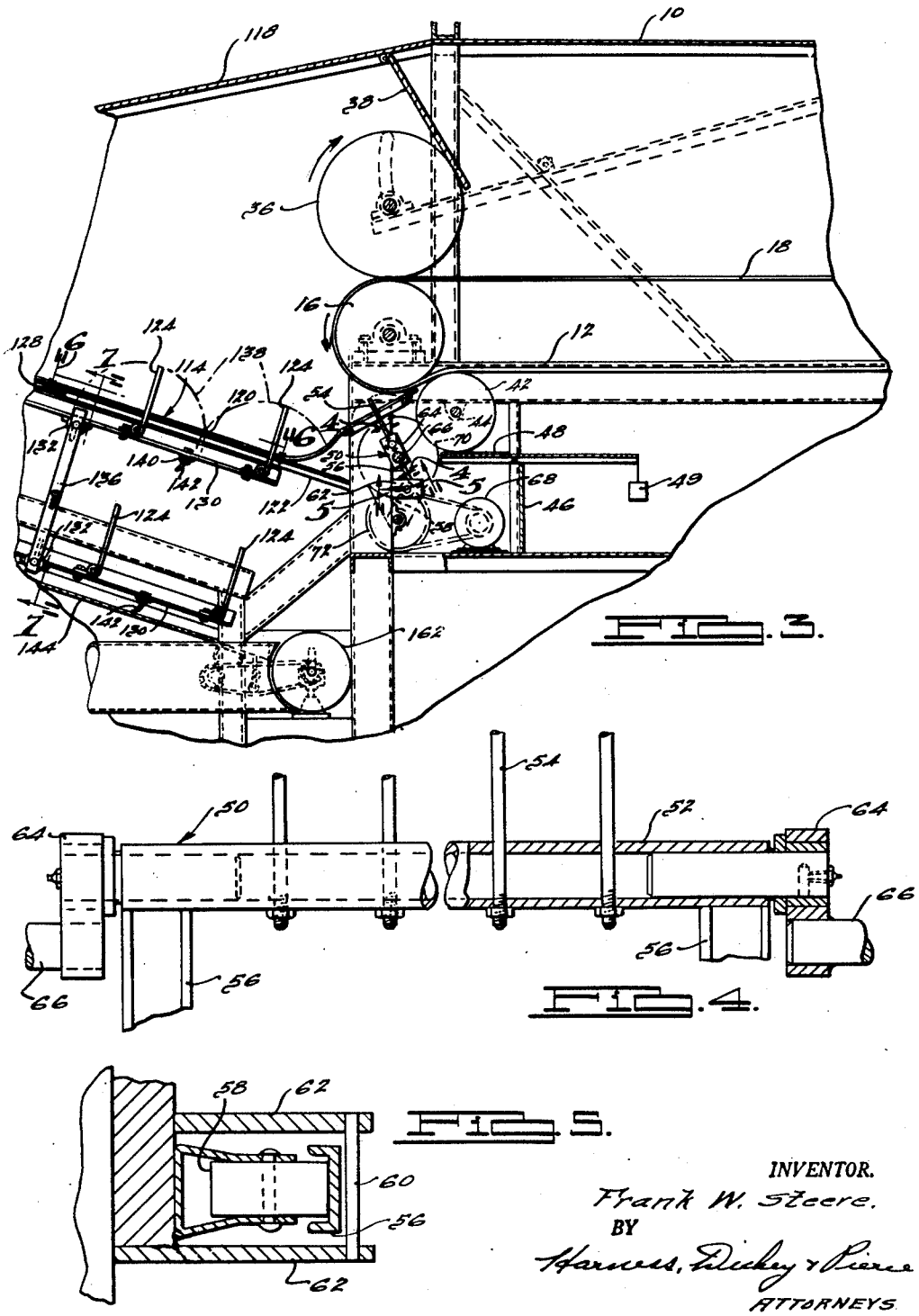

May 5, 1953 F. W. STEERE 2,637,121
PROCESS FOR TREATING FOLIAGE CROPS AND THE LIKE
Filed Nov. 4, 1947 3 Sheets-Sheet 3
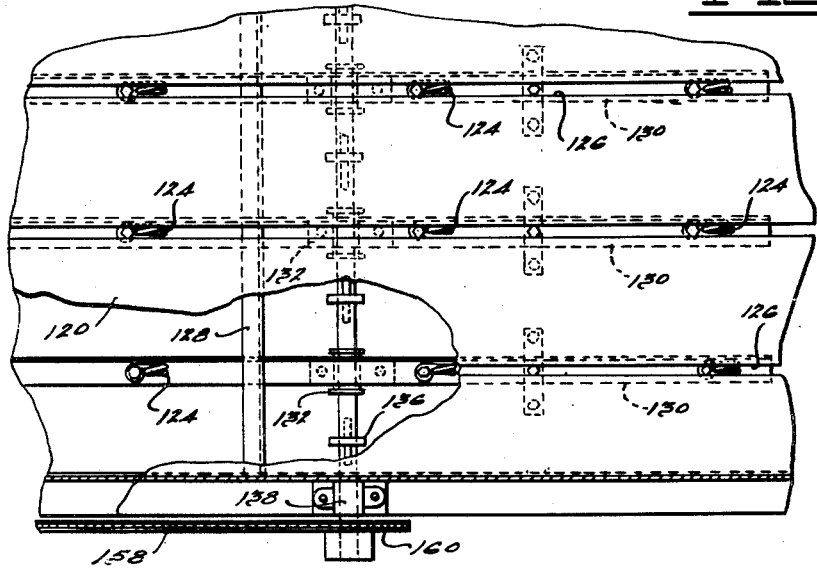
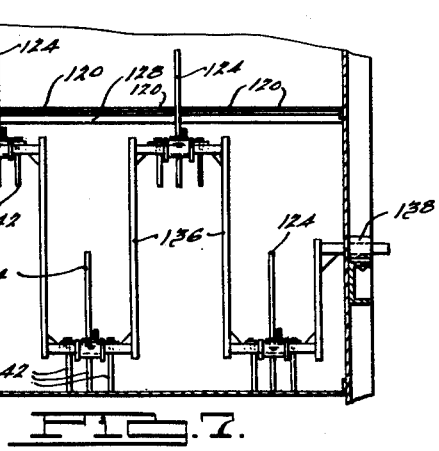
INVENTOR.
Frank W. Steere.
BY
Harness, Dickey & Pierce
ATTORNEYS.

Patented May 5, 1953

2,637,121

UNITED STATES PATENT OFFICE 2,637,121

PROCESS FOR TREATING FOLIAGE CROPS AND THE LIKE

Frank W. Steere, Waterford Township, Oakland County, Mich.

Application November 4, 1947, Serial No. 783,944

2 Claims. (Cl. 34—25)

1

The present invention relates to a process and apparatus for dehydrating foliage crops, including grasses.

Alfalfa is one of the basic farm crops because of its superior properties as forage and its beneficial effect upon the soil. Accordingly, any practical method of retaining the intially high nutrient value of green alfalfa during storage would increase its monetary value and, consequently, raise the general profit level of farming operations. It has long been known that green alfalfa is exceedingly rich in nutrient values, and particularly protene and carotene, or vitamin A, the value of which, to both men and animals, is well known. However, in the curing of alfalfa as ordinarily practiced, much of the carotene in the green alfalfa, as well as other valuable nutrients, is lost.

One difficulty resides in the fact that the leaves, which make up 50% of the weight of the plant and contain approximately 75% of the nutrient value, are dried and become fragile early in the curing of the alfalfa as normally practiced. In the usual field drying this results in a shattering and a substantial loss in the most important part of the crop. In contrast, the stems are relatively heavy and tough and difficult to dry. Consequently, it has been common in alfalfa cured by previously known methods to find mold resulting from improper drying of the stems. Alfalfa which has been field dried or artificially dried by prior methods contains practically none of the original carotene content of the green crop.

It has long been known that substantially all of the nutrients in the leaves of the green crop can be retained if the leaves are quickly dried at a temperature not in excess of 300° F., but heretofore it has not been possible to utilize that knowledge commercially because such treatment would not dry the stems, and the resulting material could not be stored.

The problem is seriously aggravated by reason of the fact that in all artificial driers it is extremely difficult to dry the mass of material uniformly due to the inevitable inequalities in the distribution of the crop in the drier. It is not possible to agitate the plants during the drying operation without defoliating the crop and breaking it up before the drying is complete. As a result, in order to insure complete drying of all portions of the mass of material it has always been necessary to greatly overdry and, therefore, destroy the nutrient value of the major portion of the mass.

2

In an attempt to achieve more uniform drying in artificial driers, it has been common practice to chop the crop before feeding it to the drier. This practice not only fails to achieve complete uniformity, but leaves the final product in such form that it cannot be handled or baled like ordinary hay or feed. Therefore, it must be subjected to an expensive grinding operation. Such chopping or grinding exposes the crop to oxidation and the action of enzymes which effect a more rapid deterioration of the nutrient content of the crop during storage than occurs when the whole plants are baled.

Accordingly, it is the general object of the present invention to provide an improved process and apparatus for dehydrating alfalfa or any grasses or foliage crops and the like which will preserve the nutrient content of the crop and also permit the material to be baled and stored for extended periods of time without substantial loss in the nutrient content thereof, and which may be economically practiced on a commercial scale. Other objects and advantages of the invention will become apparent from the following specification, the accompanying drawings and the appended claims.

In the drawings:

Figure 1 is a more or less diagrammatic view, partially in section and partially in elevation, of an apparatus capable of carrying out the major portion of the improved process;

Figure 2 is a plan view of the apparatus shown in Figure 1;

Figure 3 is an enlarged fragmentary longitudinal section of a portion of the apparatus taken on the line 3—3 of Figure 2;

Figure 4 is an enlarged fragmentary transverse section of a portion of the apparatus taken on the line 4—4 of Figure 3;

Figure 5 is an enlarged fragmentary transverse section of a portion of the apparatus taken on the line 5—5 of Figure 3;

Figure 6 is an enlarged fragmentary transverse section of a portion of the apparatus taken on the line 6—6 of Figure 3; and Figure 7 is an enlarged fragmentary transverse section taken on line 7—7 of Figure 3.

In accordance with the present invention, the serious loss of nutrient values which occurs during the drying and storage of foliage crops and grasses is avoided by subjecting the green crop, which is deposited on a foraminous conveyer, to a blast of hot relatively dry gases having a velocity in excess of the maximum velocity hitherto employed for this purpose. It has been found that the use of such high rates of gas flow not only compensates for unavoidable inequalities in the distribution of the crop on the drying conveyer by insuring that adequate quantities of gas are forced through even the thickest portions of a layer, which may vary to a substantial degree in thickness, but also permits the use of gases of higher temperatures than would otherwise be permissible and, therefore, reduces the drying time. This reduction in the drying time prevents destruction of the nutrient value of even the thinnest portions of the crop layer. Since with the improved process it is unnecessary to distribute the crop in a perfectly uniform layer on the drying conveyer, the whole crop plants may be fed to the drier and distributed on the conveyer manually by means of a fork with a minimum of effort and attention, and the dried material baled for storage.

A further important advantage of the high gas flow rate is that it makes it possible to locate the furnace close to the drying chamber and feed the gaseous products of combustion (mixed with air and recirculated gas) directly to the chamber without danger of fire resulting from the unavoidable sparks carried by the combustion gas. In prior hay driers, it has been necessary, because of the fire hazard, to locate the furnace at great distances from the drier. This materially decreases the efficiency of the apparatus and increases its cost.

To obtain the best results, the crop should be cut green at the height of its nutrient value. The crop may be fed directly to the drier in that state, but is preferably allowed to wilt in the field as cut for a few hours, since the loss in moisture content incident to such wilting will reduce the load on the artificial drier. The amount of time which the crop can be left in the field without serious loss of nutrient value depends on the weather conditions, but in no case should it be so long as to cause the crop to lose its green color. On a hot dry day with bright sunshine, it should not be left more than a few hours. In cooler or humid weather, it may be left overnight. Growing alfalfa has a water content of approximately 80%, and this should not be reduced below about 35% to 45% by field drying if maximum vitamin recovery is desired.

It is preferred to carry out the drying operation in two stages, in the first of which the crop is subject to the action of hot relatively moist gases which will not only raise the temperature of the crop and perform a part of the drying operation, but are believed to have a blanching effect which sets the nutrient values and particularly the carotene content. Immediately thereafter, the crop is subject to the action of hot relatively dry gases which perform a major portion of the actual drying operation. It is in the latter operation, that is the final drying operation, in which the gas velocity previously mentioned has been found most critical.

To obtain the best results, it is preferred to circulate the heated gas in the final drying operation by a fan through the layer of crop on the drying conveyer at the rate of between 450 to 480 cubic feet per minute per square foot of conveyer area. This rate may run as low as 400 cubic feet and as high as 500 cubic feet or more per square foot per minute. However, flow rates in excess of 500 cubic feet per minute require larger quantities of power and are unnecessary. Since air flowing at these rates may lift the layer of forage crop from the conveyer if it were upwardly directed, it is preferred to direct the hot gases downwardly against the top of the crop layer while it is resting upon a substantially horizontal foraminous conveyer.

The hot gas at the point at which it strikes the crop layer is preferably maintained at a temperature as near to 300° F. as is practicable, but not in excess of 300° F. It may vary from a minimum of 250° F. to a maximum of 300° F., and excellent results have been obtained with a temperature of 285° F. The temperature may be maintained at the desired level by a thermostatically controlled damper on the furnace. The gas may contain some moisture, but is preferably as dry as possible. Thus, while a saving of fuel may be realized by recirculating and reheating the spent gases, it is necessary to discharge at least a portion thereof and supply make-up atmospheric air and products of combustion in order to reduce the moisture content to the desired level. The extent to which recirculation may be permitted will depend, of course, upon the percentage of moisture in the crop being dried, the humidity of the atmospheric air, the moisture content of the products of combustion, and the volume of gas employed per pound of crop dried.

It is preferred that the hot gases contain products of combustion. For this purpose, the preferred fuel is coke or anthracite coal, since they make a clean fire and contain little or no hydrogen. Because of the high rate of flow of the gas through the crop layer, it is possible to deliver the products of combustion to the drying chamber without danger of fire from the sparks carried by the combustion gases. This is due to the fact that the sparks do not remain in contact with the crop for a sufficient period of time to ignite the crop. Other fuels, such as gas or oil, may be used, if desired.

To obtain satisfactory results, the dew point of the hot gases should in no case exceed 180° F., and should preferably be substantially lower. A practical test which has been found satisfactory in determining the preferred upper limit for moisture content is to thrust a piece of clear glass at atmospheric temperature into the hot gases before they strike the forage crop layer and quickly withdraw it. If condensate appears upon the glass, the moisture content is too high.

With gases having temperatures within the range indicated and circulating at the rate specified above, relatively little time is required to effect complete drying of the crop (i. e., reduction in moisture content to approximately 10% to 12%, which will permit storage without mold or deterioration), and the time of exposure of the crop to the hot gases should be limited in order to prevent destruction of its nutrient value. It has been found that the preferred period of exposure of alfalfa in the final drying stage is approximately 60 seconds, but may vary from a minimum of about 40 seconds to a maximum of about 100 seconds, depending upon the amount of moisture in the crop and variations in the temperature and velocity of the gas within the limits stated above.

The temperature of the gas is preferably maintained as high as possible short of that temperature which will caramelize the crop. Such caramelizing may be readily noted, since the crop will show brownish areas if partially caramelized, as distinguished from the bright green color which it should normally have upon completion of the drying operation.

The quantity of crop per square foot of conveyer area may vary between relatively wide limits. Good average values are approximately from one-half to three-quarters of a pound per square foot of conveyer area, although at any average rate the thickness of the crop layer on the conveyer may differ widely at different points. Lower layer thicknesses would undoubtedly be satisfactory except that they reduce the production of the apparatus. It will be appreciated that the maximum thickness permissible will depend primarily on the rate of gas flow, higher flow rates being effective to penetrate thicker layers, and vice versa. At the flow rate of 500 cubic feet per minute per square foot of layer and at the exposure times and gas temperatures given above, the maximum average thickness of layer is in the order of one pound per square foot. The weights above given are the dry weights of the material, that is the weight after its moisture content has been reduced to approximately 10% to 12%.

It is advantageous to use as the relatively moist gas employed in the first stage of the drying operation the gas discharged from the final drying stage. In the first stage, the rate of gas flow should also be high but need not be maintained at the high level required in the final drying operation. Thus, the rate of flow may be two-thirds that required in the final drying stage. Since the crop at this stage is heavier and the gas flow rate lower, it is possible to direct the gas upwardly through the conveyer. The time of exposure of alfalfa in the first stage of the operation should be approximately 90 seconds, but may vary from a minimum of 60 to a maximum of 150 seconds. The temperature of the gas should exceed 212° F. and not exceed 300° F., and, consequently, it will preheat the crop to approximately 200° F. or more before it enters the final drying stage.

In one satisfactory installation, the temperature of the hot gas on the average dropped from 285° F. to approximately 245° F. in passing through the second or final drying stage, and dropped to approximately 210° F. after passage through the first stage of the drying operation. Under these conditions, the gas circulated through each square foot of conveyer in the final drying stage was 475 cubic feet per minute, and that gas contained the fresh products of combustion of about 4 pounds of coke per hour; the balance was fresh air and recirculated gas.

If desired, to increase the rate of drying, either in the field or in the artificial drying operation, the crop may be subjected to a crushing operation between rollers before it is artificially dried. However, this operation has not been found essential.

While as above described the drying operation is preferably carried out in two stages by circulating the gas successively through the crop in two sections of the drier, it should be understood that many of the advantages of the invention may be realized by omitting the first stage and correspondingly increasing the time of exposure of the crop in the single final stage, or by adding additional preliminary drying stages, each of shorter duration than the first stage previously described.

After the final drying operation, the crop, if to be used as forage, is preferably baled and placed in storage. If the material is baled while still warm, it should be stored in an aerated space having means to circulate air around the bales for 2 or 3 days, to insure that all of the bales will be sufficiently cooled to prevent damage.

The above described process permits the crop to be processed and stored for extended periods of time while retaining much higher nutrient values than possible by previously known methods. The resulting product is accordingly of greatly increased value. For example, the carotene content of samples of alfalfa which had been treated by the above method was in excess of 220,000 units per pound on an anhydrous basis, as compared with 56,000 units of carotene in fresh sun-dried alfalfa samples from the same field.

The process is of great value in treating various plants from which drugs are extracted. For example, increased yields of rutin are obtained from buckwheat treated by the process; and the process is beneficial in treating belladonna and purple foxglove (digitalis). In general, each different crop requires a different time of exposure in the machine. For example, buckwheat requires approximately six times as long an exposure as alfalfa under the same conditions. These variations are most readily compensated for by changing the speed of the crop conveyer.

While any desired form of apparatus may be utilized to carry out the method of the present invention, there is illustrated in the drawings of the present application a preferred form of apparatus peculiarly adapted for this purpose.

Referring to the drawings, the machine comprises an elongated tunnel 10 which is generally square or rectangular in cross section and is preferably made of sheet metal in sections which are secured together. The tunnel 10 includes a frame structure 12 at opposite ends of which rollers 14 and 16 are rotatably mounted. Roller 14 is located outwardly of the entrance to the tunnel 10 and a foraminous belt 18 is trained over the rollers 14 and 16. The belt 18 is preferably formed of wire mesh and its upper course between the rollers 14 and 16 is supported by a plurality of idler rollers 20 rotatably supported on the frame structure 12.

At the loading or entrance end of the tunnel 10, as best illustrated in Figure 1, the space above the upper course of the belt 18 is closed by the transversely disposed sealing roller 22 and the co-operating sealing plate 24. The roller 22 is mounted over one of the idler rollers 20. To permit vertical movement of the sealing roller 22 relative to the upper course of the belt 18, as required to permit the crop which has been loaded upon the upper course of the belt 18 to be carried into the tunnel 10, the roller 22 is rotatably mounted at its opposite ends on the corresponding ends of arms 26 pivotally mounted externally on the tunnel 10. The roller 22 is counterbalanced by weights 28 connected to the opposite ends of the pivot arms 26. This counterbalancing of the roller 22 prevents excessive matting of the crop as it passes under the roller 22 and into the tunnel, but affords sufficient pressure to provide an effective seal preventing the escape of the hot gases from within the tunnel. The sealing plate 24 is pivotally mounted at its upper edge on the upper wall of the tunnel and is held against the inner surface of the sealing roller 22 by its own weight and by the slight differential pressure between the hot gases within the tunnel and the atmosphere. The space intermediate the upper and lower courses of the belt 18 is sealed at the loading end by the transversely extending sealing plate 30, which engages the lower course of the belt and the idler roller 20 disposed below the roller 22. To prevent clogging or failure of the materials to enter the tunnel, the roller 22 is preferably driven by means of a chain 32.

A door 34 is pivotally mounted in the end wall of the tunnel 10 below the lower course of the belt 18. This door may be opened when necessary to permit the circulating gas to blow any accumulated dust or crop particles from the floor of the drier.

As best shown in Figure 3, the exit end of the tunnel 10 is provided with a sealing roller 36 and a co-operating pivoted sealing plate 38, similar in construction and mode of operation to the sealing roller 22 and the sealing plate 24. The roller 36 is also driven in the direction indicated by the arrow by a chain 40, hereinafter described in greater detail. Below the drum 16, escape of the hot gases from the exit end of the tunnel 10 is prevented by a tightener roller 42, which engages the lower course of the belt 18 in close proximity to the point at which it leaves the drum 16. The tightener roller 42 is adjustably mounted in bearing blocks 44, which may be adjustably mounted on the frame structure 12 by any suitable means. The space between the tightener roller 42 and the bottom of the tunnel 10 is closed by a stationary transversely extending sealing plate 46 and a pivotally mounted sealing plate 48 which is held against the under surface of the tightener roller 42 by a weight 49 and closes the space between the tightener roller 42 and the stationary transverse sealing plate 46.

An oscillating rake mechanism 50 is provided for cleaning from the belt 18 any material which tends to become entangled in the belt and return along the tunnel 10 on the lower course of the belt. Referring to Figures 3, 4 and 5, the rake mechanism 50 comprises a transversely extending bar 52 in which is fixed a plurality of transversely extending prongs or tines 54 disposed in parallel relation. The bar 52 is also provided with a pair of guide bars 56 secured thereto adjacent its opposite ends and extending in opposed relation to the prongs 54. The guide bars 56 are channel-shaped and ride between rollers 58 and pins 60 carried by bracket plates 62 secured to the frame structure 12. The outer ends of the bar 52 are journaled in cranks 64 fixed to trunnions 66 which are rotatably supported on the frame structure 12. As the result of this construction, rotation of the trunnions 66 and cranks 64 causes the bar 52 to rotate about the axis of the trunnions 66 and the bar 52 to oscillate about its own axis by the action of the guide bars 56 which slide between rollers 58 and the pins 60.

It will be appreciated that by this construction, upon rotation of the trunnions 66 in a counterclockwise direction, as viewed in Figure 3, the prongs 54 are thrust into the material clinging to the belt 18 while moving in a direction which is substantially along the axis of the prongs 54. These prongs are then moved away from the belt 18 while moving in a direction generally at right angles to their axis and are finally withdrawn from the material removed from the belt while moving in a direction substantially along their axis. Movement of the prongs 54 in this manner prevents the accumulation of the crop on the prongs 54 and effectively cleans the crop from the belt 18.

The rake mechanism 50 may be driven in any suitable manner, but in the preferred embodiment illustrated, as best shown in Figure 3, an electric motor 68 is mounted at the bottom of the tunnel 10 and drives a sprocket wheel 70 fixed on one of the trunnions 66, through an intermediate speed reducing sprocket 72.

In order to divide the upper portion of the tunnel 10 into two compartments, as best shown in Figure 1, an intermediate sealing roller 80 and co-operating sealing plate 82 are provided. The roller 80 and the sealing plate 82 are constructed and operate in the same manner as roller 22 and sealing plate 24 described above, and thus serve to seal the space above the belt at one end of the tunnel from that at the other. The shaft of the roller 80 extends outwardly of the pivot arm 84 in which it is mounted and carries three sprocket wheels, the outer of which is fixed to the shaft and receives the aforementioned chain 32. The rollers 16, 36 and 80 are driven by a single chain 40 having four courses. Thus, the chain 40 runs first from the bottom of sprocket 85 on the shaft of roller 16 to the bottom of an idler sprocket 86, which is loose on the shaft of roller 80, thence from the top of sprocket 86 to the bottom of sprocket 87, which is fixed on the shaft of roller 36, thence from the top of sprocket 87 to the top of sprocket 88, which is fixed to the shaft of roller 80, and thence from the bottom of sprocket 88 to the top of sprocket 85. This drives the rollers 16 and 36 in the directions of the arrows in Figure 3, and rollers 22 in the same direction as roller 16.

As illustrated, the sealing roller 82 is disposed so that the two compartments into which it divides that portion of the tunnel above the belt 18 are not equal in size, the compartment between the rollers 80 and 36 being substantially smaller than that between the rollers 80 and 22. This relative proportioning of the compartments provides the above described differential in the volume of flow of the gases in the blanching step and the final drying step. Similarly, it provides the above described time differential in these two steps. This also permits the gas to flow downwardly through the crop at high velocity in the final drying stage and upwardly through the crop at a reduced speed in the blanching stage, thereby reducing the likelihood of blowouts.

Any suitable means may be provided for heating and circulating heated gas through the tunnel to dry the material on the belt. Thus, in accordance with the diagrammatic illustration in Figures 1 and 2, there is provided a furnace indicated generally at 90. Any suitable fuel may be burned in the furnace, but where the products of combustion are included in the circulated gases, for the reasons above stated, coke is preferred. A standpipe 92 having a damper 94 is connected through the upper wall of the tunnel 10 at the right-hand or intake end thereof for discharging to the atmosphere any desired quantity of the circulating hot gases. The jacket space of the furnace 90 is also connected to a standpipe 96 having a damper 98 which afford an air intake to replace part of the gas and water vapor discharged through the standpipe 92. The remainder of the make-up air is taken into the furnace through the draft damper (not shown) by means of which the rate of combustion is controlled, and through the fuel charging door. The hot gases which are to be recirculated return from the upper wall of the right-hand end of the tunnel through a conduit 100 to the intake standpipe 96. This conduit 100 is provided with a damper 102 for controlling the quantity of hot gases which are to be recirculated. From the jacket of the furnace 90, the hot gases pass through a conduit 104 provided with an emergency shutoff damper 106 to the blower 108. The combustion chamber of the furnace is also connected to conduit 104, with the result that the hot gases which are mix with the products of combustion mix with the recirculated gases and any make-up which may be drawn in through the standpipe 96, and the entire mixture passes to the intake of the blower 108. These gases are drawn into the blower 108 and discharged through a conduit 110 into the tunnel 10 through an opening in the upper wall thereof disposed above the belt 18 and intermediate the sealing plates 82 and 36. The above described arrangement of sealing rollers and sealing plates causes the gases to pass downwardly through the belt 18 and the material carried thereon, along the tunnel toward the righthand or loading end thereof, and thence upwardly through the belt 18 and the material carried thereon intermediate the sealing rollers 22 and 80. It will be understood that in order to conserve fuel, these hot gases are preferably recirculated through the conduit 100 to as great a degree as possible consistent with preventing an excessive moisture content in the hot gases. also, it will be appreciated that the temperature of these hot gases may be controlled by adjusting the draft damper of the furnace and by adjusting the dampers 94, 98 and 102 which determine the amount of make-up air added to the system and what proportion of the hot gases is recirculated. As a practical matter, it has been found satisfactory to control the furnace damper (below the fire bed) by a conventional thermostatic control mechanism responsive to the temperature of the gas above the conveyer in the final drying stage and to control the dampers 94, 98 and 102 manually. The blower 108 is of sufficient capacity to circulate gases at the rate specified above and is effective to apply a forced draft (suction) to the furnace. The furnace is preferably of such capacity that 4-5 pounds of coke per square foot of conveyer area (final drying stage) per hour may be burned.

The crop which falls from the belt 18 at the exit end of the tunnel, and which is removed from the belt by the rake mechanism 50, is preferably carried to a baler indicated at 112 in Figure 1. In the apparatus illustrated, this is accomplished by a walking conveyer 114, which receives the crop discharged from the belt 18 and, in turn, discharges it into a chute 116, down which it slides to the baler 112.

The walking conveyer 114 is mounted in a generally rectangular housing 118 which is secured to the exit end of the tunnel 10. As best illustrated in Figure 1, the housing 118 is inclined upwardly from the right-hand end, which is secured to the tunnel 10, to the left-hand end, where the crop is discharged onto the upper end of the chute 116. Referring to Figures 3, 6 and 7, the housing 118 is provided with a transversely extending inclined floor formed of a plurality of plates 120 disposed parallel to the lower wall of the housing 118 and supported on transverse angle irons 128 which rest on angle irons 122 extending longitudinally of the housing. At its lower end, the plates 120 are turned upwardly and receive the crop discharged from the belt 18. The dried crop is moved along the plates 120 to the left and upwardly by a plurality of prongs 124 which project through co-operating parallel slots 126 extending longitudinally of and between the plates 120.

The prongs 124 are mounted on longitudinally extending supporting members 130 which may comprise lengths of standard angle iron. These angle irons 130 are disposed in parallel relation and are each provided with spaced bearing blocks 132 in which are journaled the throws 134 of crankshafts 136. The crankshafts 136 extend transversely of the housing 118 and are journaled at opposite sides thereof in bearing blocks 138. During rotation of the crankshafts 136, the prongs 124 and the supporting angle iron members 130 upon which they are carried are rotated through the upper and lower positions illustrated in Figures 3 and 7. As best illustrated in Figure 7, the crankshaft 138 has a conventional arrangement of throws, whereby when alternate angle iron members 130 and the prongs 124 supported thereby are in the upper position, the remaining angle irons 130 are in the lower position. It will thus be appreciated that during rotation of the crankshafts 136, the prongs 124 pass up through the slots 126, sweeping out arcuate paths, as indicated at 138 in Figure 3.

As best illustrated in Figures 3 and 7, the supporting members 130 also carry spaced brush plates 140 which carry downwardly projecting brush elements 142. During each revolution of the crankshaft 136, the brush elements 142 engage the lower wall 144 of the housing 118 while moving downwardly relative thereto and are effective to sweep any of the crop falling through the plate 120 downwardly toward the right-hand lower end of the housing 118.

Although it will be appreciated that the walking conveyer may be driven in any suitable manner, in the embodiment illustrated, as best seen in Figure 1, an electric motor 150 is mounted on a platform 152 supported on the housing 118 at the upper end thereof. The motor 150 is drivingly connected through a gear box 154 to one of two sprocket wheels 156 carried on an outwardly projecting end portion of the upper of the crankshafts 136. The other of the sprocket wheels 156 receives a driving chain 158, which is also trained over a sprocket wheel 160 mounted on the lower crankshaft 136.

It will be noted that during the movement of the crop along the conveyer, the highly heated plants will be gently agitated and aerated, thereby reducing their temperature. Some of the hot gases may be permitted to escape from the first drying stage into housing 118, to assist in removing any residual moisture in the plants during the period that they are carried by the walking conveyer.

Any material which falls through the plates 120 is swept to the lower end of the housing 118 by the brush elements 142, as above described, is collected by a helix or worm 162 (see Figure 3) disposed transversely of the housing 118, and is carried to one end of a conduit 164. The other end of the conduit 164 is disposed at the lower end of the chute 116 and is upwardly turned and widely flared to catch the material not picked by the baler 112. Intermediate its ends, the conduit 164 communicates with a suction line 166 which is connected to the intake side of a blower 168. The discharge from the blower 168 passes through a conduit 170 to a separator 172, from the bottom of which the crop particles may be withdrawn and bagged. It will be understood that this material comprises only a very minor portion of the whole crop, consisting largely of a few leaves which may fall off the plants as they are carried up the walking conveyer.

A single electric motor 174 and gear box 176 illustrated diagrammatically in Figure 1, may be employed to drive the conveyer drum 16, the sealing rollers 22, 33 and 80, and the helix 162. The conveyer drum 16, at the discharge end of the tunnel 10, is driven directly from the gear box 176 by a chain 89, and the helix 162 is driven from the gear box by a chain 99.

The baler 112 may be of any suitable construction. Also, the baled crop may be aerated in storage by any suitable apparatus. The air conduits within the storage place may be formed by the bales, themselves, or by ducts in the floor, and any blower of suitable capacity may be used. If desired, the baler may be replaced by a mill for grinding the dried crop.

What is claimed is:

1. In a method of treating green crop containing at least 35 per cent water, the steps of artificially drying the crop by spreading it in a layer averaging from about .50 to 1.0 pounds per square foot (dry weight) and first subjecting it to the action of gases containing appreciable quantities of water vapor and at a temperature in excess of 212° F. for a period of from 60 to 150 seconds and thereafter reducing the water content of the crop to not more than 12 per cent within a period of from 40 to 100 seconds by the action of a moving current of gases at a temperature from 250° to 300° F. and having a dew point less than 180° F., the rate of flow of gas through the crop in the second drying period being from 400 to 500 cubic feet of gas per minute per square foot of said layer.

2. In a method of dehydrating green alfalfa, the steps of spreading the green crop on a foraminous surface in a layer averaging approximately .50 to 1.0 pounds per square foot (dry weight) in thickness and subjecting the crop layer in two successive stages to the action of a current of hot gases which flows first through the crop layer in the second stage in a direction to hold the crop against the foraminous surface and then through the crop layer in the first stage, said hot gases prior to passage through the layer having a temperature of approximately 285° to 300° F. and a dew point below approximately 180 F., said current of hot gases flowing through the crop layer in the second stage at the rate of from 450 to 480 cubic feet of gas per minute per square foot of layer and said crop layer in the second stage being exposed to said hot gases for approximately 60 seconds.

FRANK W. STEERE.

References Cited in the file of this patent

UNITED STATES PATENTS

| Number | Name | Date |
|---|---|---|
| 1,191,980 | Mason | July 25, 1916 |
| 1,235,027 | Harrison | July 31, 1917 |
| 1,264,955 | Mason | May 7, 1918 |
| 1,374,874 | Bassler | Apr. 12, 1921 |
| 1,547,294 | Braemer | July 28, 1925 |
| 1,572,326 | Straight | Feb. 9, 1926 |
| 1,667,428 | Mason | Apr. 24, 1928 |
| 1,681,175 | Donato | Aug. 21, 1928 |
| 1,713,619 | Owen | May 21, 1929 |
| 1,941,561 | Lee | Jan. 2, 1934 |
| 2,100,150 | Randolph | Nov. 23, 1937 |
| 2,135,636 | Fulmer | Nov. 8, 1938 |
| 2,350,096 | Chilton | May 30, 1944 |
| 2,398,821 | Davidson | Apr. 23, 1946 |

FOREIGN PATENTS

| Number | Country | Date |
|---|---|---|
| 283,014 | Great Britain | Jan. 5, 1928 |
| 22,708/29 | Australia | Oct. 21, 1930 |

OTHER REFERENCES

Fan Engineering, Buffalo Forge Company, Buffalo, New York. Fifth edition, Copyright 1948, pages 95 and 514–517 relied on.